US011966771B2

(12) United States Patent
De Marco et al.

(10) Patent No.: US 11,966,771 B2
(45) Date of Patent: *Apr. 23, 2024

(54) DYNAMIC IMAGE COMPOSITION FOR CONTAINER DEPLOYMENT

(71) Applicant: Microsoft Technology Licensing, LLC, Redmond, WA (US)

(72) Inventors: Jonathan De Marco, Seattle, WA (US); Benjamin M. Schultz, Bellevue, WA (US); Frederick Justus Smith, IV, Redmond, WA (US); Hari R. Pulapaka, Redmond, WA (US); Mehmet Iyigun, Kirkland, WA (US); Amber Tianqi Guo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,182

(22) Filed: Jan. 13, 2023

(65) Prior Publication Data

US 2023/0244516 A1    Aug. 3, 2023

Related U.S. Application Data

(63) Continuation of application No. 16/597,657, filed on Oct. 9, 2019, now Pat. No. 11,556,367.

(Continued)

(51) Int. Cl.
G06F 9/455    (2018.01)
G06F 16/13    (2019.01)
G06F 16/14    (2019.01)

(52) U.S. Cl.
CPC .......... *G06F 9/45558* (2013.01); *G06F 16/13* (2019.01); *G06F 16/148* (2019.01);
(Continued)

(58) Field of Classification Search
None
See application file for complete search history.

(56) References Cited

U.S. PATENT DOCUMENTS 5,832,527 A  * 11/1998  Kawaguchi ............. G06F 16/10
7,340,444 B2 *  3/2008  Hipp ........................ G06F 9/50
(Continued)

OTHER PUBLICATIONS

"Notice of Allowance Issued in U.S. Appl. No. 16/293,456", dated Apr. 26, 2023, 11 Pages.
(Continued)

*Primary Examiner* — Van H Nguyen

(57) ABSTRACT

Computing systems, devices, and methods of dynamic image composition for container deployment are disclosed herein. One example technique includes receiving a request for accessing a file from a container process. In response to receiving the request, the technique includes querying a mapping table corresponding to the container process to locate an entry corresponding to a file identifier of the requested file. The entry also includes data identifying a file location on the storage device from which the requested file is accessible. The technique further includes retrieving a copy of the requested file according to the file location identified by the data in the located entry in the mapping table and providing the retrieved copy of the requested file to the container process, thereby allowing the container process to access the requested file.

20 Claims, 7 Drawing Sheets

Related U.S. Application Data

(60) Provisional application No. 62/883,341, filed on Aug. 6, 2019.

(52) U.S. Cl.
CPC ............... *G06F 2009/4557* (2013.01); *G06F 2009/45583* (2013.01); *G06F 2009/45595* (2013.01)

(56) References Cited

U.S. PATENT DOCUMENTS

| | | | | |
|---|---|---|---|---|
| 7,627,547 | B2 * | 12/2009 | Jain | G06F 16/188 |
| 8,145,673 | B2 * | 3/2012 | Bloesch | G06F 16/284 |
| | | | | 707/790 |
| 8,296,398 | B2 * | 10/2012 | Lacapra | H04L 67/1097 |
| | | | | 209/217 |
| 9,747,168 | B2 * | 8/2017 | Haustein | G06F 11/1451 |
| 9,819,570 | B2 * | 11/2017 | Abe | H04L 45/02 |
| 9,852,137 | B2 * | 12/2017 | Mann | G06F 16/119 |
| 9,898,354 | B2 * | 2/2018 | Engel | G06F 9/44536 |
| 10,146,793 | B2 * | 12/2018 | Srivas | G06F 16/27 |
| 10,740,132 | B2 * | 8/2020 | Goel | G06F 9/545 |
| 10,855,725 | B2 * | 12/2020 | Pai | G06F 21/53 |
| 10,938,619 | B2 * | 3/2021 | Rachamadugu | H04L 63/20 |
| 11,126,740 | B2 * | 9/2021 | Havewala | G06F 3/0644 |
| 11,556,367 | B2 * | 1/2023 | De Marco | G06F 16/13 |
| 11,775,475 | B2 * | 10/2023 | Guo | G06F 16/13 |
| | | | | 707/821 |

OTHER PUBLICATIONS

Boykov, et al., "Interactive Graph Cuts for Optimal Boundary & Region Segmentation of Objects in N-D Images", In Proceedings of the Eighth IEEE International Conference on Computer Vision, Jul. 7, 2001, pp. 105-112.

"Office Action Issued in European Patent Application No. 20713789.4", dated Mar. 1, 2023, 5 Pages.

* cited by examiner

DYNAMIC IMAGE COMPOSITION FOR CONTAINER DEPLOYMENT

CROSS-REFERENCE TO RELATED APPLICATION(S)

This application is a continuation of U.S. patent application Ser. No. 16/597,657 filed on Oct. 9, 2019 (now U.S. patent Ser. No. 11/556,367), which claims benefit of U.S. Provisional Application No. 62/883,341, filed Aug. 6, 2019, and which applications are incorporated herein by reference in their entireties. To the extent appropriate a claim of priority is made to both applications.

BACKGROUND

Sandboxing is a software management strategy devised to isolate operating systems and/or applications from underlying computing resources and other programs on a host device. For example, datacenters providing cloud computing services can include a large number of servers individually hosting one or more virtual machines, containers, or other types of virtualized components. The virtualized components can separately execute applications for tenants without having direct access to the underlying computing resources of the severs or to one another. Sandboxing can thus provide a layer of security that prevents malware or harmful applications from negatively affecting a host device or other virtualized components on the same host device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though both virtual machines and containers can be used as virtualization techniques to accommodate compute, communications, or other types of computing services, virtual machines and containers have different characteristics. For instance, virtual machines can incur a significantly more overhead in resources than containers. A virtual machine typically has an entire operating system, a full set of files and directory structures, a unique configuration, virtual memory allocation, and applications, all of which can amount to tens of gigabytes in size. In contrast, containers (e.g., Docker-based containers) are software packages that provide facilities a software application or service needs to run, such as code, runtime, tools, system libraries, etc. Containers can share resources of a host device, such as an operating system kernel, device drivers, data files, configuration parameters, etc. Thus, containers typically have a much lower memory and image footprints than virtual machines (e.g. megabytes instead of gigabytes in size).

Software packages of containers, or container images, can include digital data representing a complete filesystem (e.g., organized as a file folder with subordinate file folders) that contains operating system kernels, device drivers, event logs, temporary files/directories, applications, and/or other suitable components. Container images typically have sizes of about a few hundred megabytes. In datacenters or other computing environments with abundant computing/network resources, deploying such container images generally would not cause undue delays. However, in other computing environments with scarce computing/network resources (e.g., smartphones, Internet of Things (IoT) devices, etc.), deploying a container image of a few hundred megabytes may cause unacceptable delays. For instance, transmitting a few hundred megabytes of data via a slow data network (e.g., a satellite data network, Zigbee network, etc.) can take up significant amounts of time.

One technique to reduce data sizes of container images includes dynamically generating a container image during deployment time based on a recipe file. The recipe file can identify layers of software components, such as, a "base layer" having kernel modules, device drivers, applications, etc. that are available from a host operating system at the host device, one or more "modification layers" to a container to supplement and/or modify one or more files in the base layer, and a "scratch layer" having files for capturing modifications unique to the container. For example, the base layer can include a set of clean, unmodified copies of operating system files and a set of reparse points that are placeholders that redirect to a host/package file. Examples of such clean files can include a registry and other files usually modified during installation processes.

The various layers of a container image can be captured using a virtual hard disk ("VHD") or other suitable techniques. During deployment, a container manager on the host device can dynamically generate a full container image having the files unique to the container and the base and modification layers according to the recipe file, for example, by copying or creating hard links to the identified components from the host operating system. As such, the sizes of the container images transmitted for deployment can be reduced, for example, from a few gigabytes to a few hundred megabytes.

Though the layering technique may facilitate file sharing with the host operating system to reduce a footprint of the deployed container image, the foregoing container image generation technique may also cause certain difficulties under certain circumstances. For example, the base layer and the one or more modification layers are typically defined in a recipe file and not modifiable post instantiation. As such, additional components (e.g., new reparse points) to the base and/or modification layers not initially included may not be added after the container starts running. In order to insert additional components into the base and/or modification layers, a new container may be initiated in place of the original container. In addition, using virtual hard disks ("VHDs") to store the reparse points used for translating container file locations to host file locations can occupy a significant amount of storage space. The VHDs can each include thousands of reparse points and thus require a significant storage space. Moreover, a predefined VHD stack can become unreliable as third-party drivers of storage devices sometimes disrupt the predefined VHD stack and thus result in unsupported errors.

Further, producing a container image for deployment may require significant amount of build time and resulting in high production costs. For instance, one implementation of producing a container image can include two build processes to produce and provide for deployment a container image. To build the container image, a first virtual machine is initiated to run setup on a VHD according to a recipe file, for instance, by generating a VHD that captures an initial container image with various files and reparse points. A second virtual machine can then be instantiated to provide the container image captured in the VHD for deployment. As such, by using two virtual machines to produce a container image, the engineering/production process can incur significant amount of build time and thus resulting in high production costs.

Several embodiments of the disclosed technology can address at least some aspects of the foregoing difficulties by implementing a bind filter in cooperation with a mapping table to dynamically identify and facilitate access to additional and/or different files and components to the base and/or modification layers. In certain embodiments, a container manager on a host can be configured to virtualize a file system of a container using a bind filter (e.g., via using Windows Container Isolation FS Filter Driver or "WCIFS") hosted on the host device. In other embodiments, the container manager can be configured to virtualize the file system of a container using other suitable hardware/software components configured to redirect input/output (IO) requests for files of a container.

In certain implementations, the bind filter can be configured to maintain a mapping table or mapping tree in-memory (e.g., virtual memory allocated to the deployed container). The mapping table can include one or more entries individually containing a reference to redirect an IO request for a file to an appropriate file location. The mapping table can be instantiated by the host and updated each time a new file(s) or package is dynamically added to a container image of an initial instantiation. In one example, a package designer can define a mapping configuration file that contains a mapping entry for each file included in a given package. The configuration file can then be used to generate a binding file that is written in disk and included in a container image. The binding file can contain machine-readable bytes that are consumable by the bind filter to build and update the mapping table.

While the package and file(s) of the package can be stored in any suitable locations on a host, the binding files or as a "binding package" can be placed in either a local or global binding store. Each container may include a corresponding local binding store for storing and access a single-container specific binding package. An example of a single-container specific binding package can be a debug package, which may be applicable only to a certain container. The global binding store can contain binding packages that are applicable to multiple or all containers on a host. Example binding packages in the global binding store may include binding files related to system update of the host of containers.

In accordance to certain aspects of the disclosed technology, a base layer of a container can include a directory structure that is similar to that of a full operating system installation. For example, the base layer can include a combination of original or "pristine" files and reparse points. When a reparse point in the base layer is requested, for instance, by an application executing in the container, the container manager can redirect a corresponding IO request to the bind filter. The bind filter in turn, can look up a corresponding entry in the mapping table and direct the IO request to an appropriate location, for instance, a pristine file in the base layer. In another example, the bind filter can redirect the IO request to a host file sharing server (e.g., a virtual server message block share or "VSMB" share) running on the host for a file stored on the host. The host file sharing server can expose host directory trees to a guest such as the container and can be reconfigured on the host via a host SMB server. A guest server message block ("SMB") client (e.g., running on the container) can communicate with a host file sharing server via a virtual machine bus ("VM-BUS"). As such, via the host file sharing server, the IO request can be redirected to a suitable location at which a corresponding file from the host can be accessed. In some embodiments, the host file sharing server may be remote and may run any suitable types of operating system that supports a network file system or facility to distribute files such as SMB/CIFS, Network File System (NFS), etc. In some embodiments, the communication channel between the container and the host may be something other than a VMBUS, for example the communication channel may be implemented as a network connection, or as a remote procedure call (RPC), or via other suitable techniques.

In further examples, the redirected IO request can also be mapped to remote locations, such as a public/private cloud computing system, to provide efficient update and/or other servicing of the containers. For example, a flow of an operating system update can include an update server (e.g., in a public cloud) sends an update notification to a local update client on the host. The update notification includes binding files (e.g., containing update to the existing mapping table entries) that point to a remote location in the update server's file share in the cloud. The update client calls the bind filter, resulting in redirection update to the in-memory mapping table being directed to the update share's location. When a new IO request is received, the bind filter redirects the IO request to the updated file's location in the cloud according to the updated mapping table, which can trigger a local download process of a new version of an existing file. If another process is currently using an old version of the existing file, the new version of the file is copied into a temporary location on the host. The old version can be written over once use by the process of the old version of the existing file is completed. In some embodiments, the mapping table entries may contain deferred paths, for example a partial path that contains aliased directories, aliased volume roots, user-defined directory locations, identity defined directory locations, etc. The deferred paths may be resolved by a container engine either at setup time or at runtime depending on system configuration. In some embodiments, there may be an independent or integrated policy or configuration that only exposes some files on the host to the container.

In some embodiments, a backup and/or caching system may be implemented in the mapping table and/or components supporting the mapping table. In one example, for a target file, the mapping table may have both a primary location and a backup location for the same target file. In another example, for a target file, the mapping table may have two instances of the same file that have different security profiles (e.g. hosting locations, container locations, digital signatures, etc.). During operation, the mapping table can be configured to select one of the instances of the file or from one of the file locations based on security, availability, or some other parameters. For instance, if a requesting container is outside of a secure network, the mapping table may prefer an instance of the file from a secure location. However, if the requesting container is in a secure network, and a local file source is available, the mapping table may select an instance of the file from that local network. In yet another example, a caching system may be implemented to ensure that the mapping table has the most up-to-date version of a file. The mapping table can be configured to provide a particular version (e.g., the most recent version, last version, etc.) of the file based on a file version number, publication date, or other suitable metadata.

In other implementations, the host file sharing server can also be configured to examine a request for a file from a container and serve the requested file. In some embodiments, the host file sharing server can examine the container that is requesting the file, analyze a profile of the container (e.g. hardware configuration, location, or other metadata) and determine which file to serve based on profile of the container. In one example, a container may have certain hardware requirements, and the host file sharing server can provide the appropriate file or a version of the file (e.g., a software driver) to the container. In another example, the container may be in an insecure location and the host file sharing server can only serve files that are publicly known, and not provide access to files that implement proprietary functionality or trade secrets.

Several embodiments of the disclosed technology can thus allow flexible deployment and update of container images in computing systems. In one aspect, several embodiments of the disclose technology avoid using VHDs to store reparse points as each link is now stored in memory of the host as an entry in the mapping table maintained by the bind filter. Multiple containers can reference the same shared file according to corresponding mapping tables. As such, the dependency on the VHD stack may be eliminated, and thus saving disk space and reducing instabilities due unsupported errors of the VHD stack caused by third-party drivers. By not storing the reparse points in the VHDs, the build process of using the first virtual machine to setup and capture of a base package can be eliminated, and thus reducing the build process by half. In addition, a deployed container image can be dynamically modified via changes to the mapping table. These changes can occur "on-the-fly" while the container is running because the bind filter is configured to remap the file locations and resolving queries for files/packages on-the-fly.

DETAILED DESCRIPTION

Figure 1:
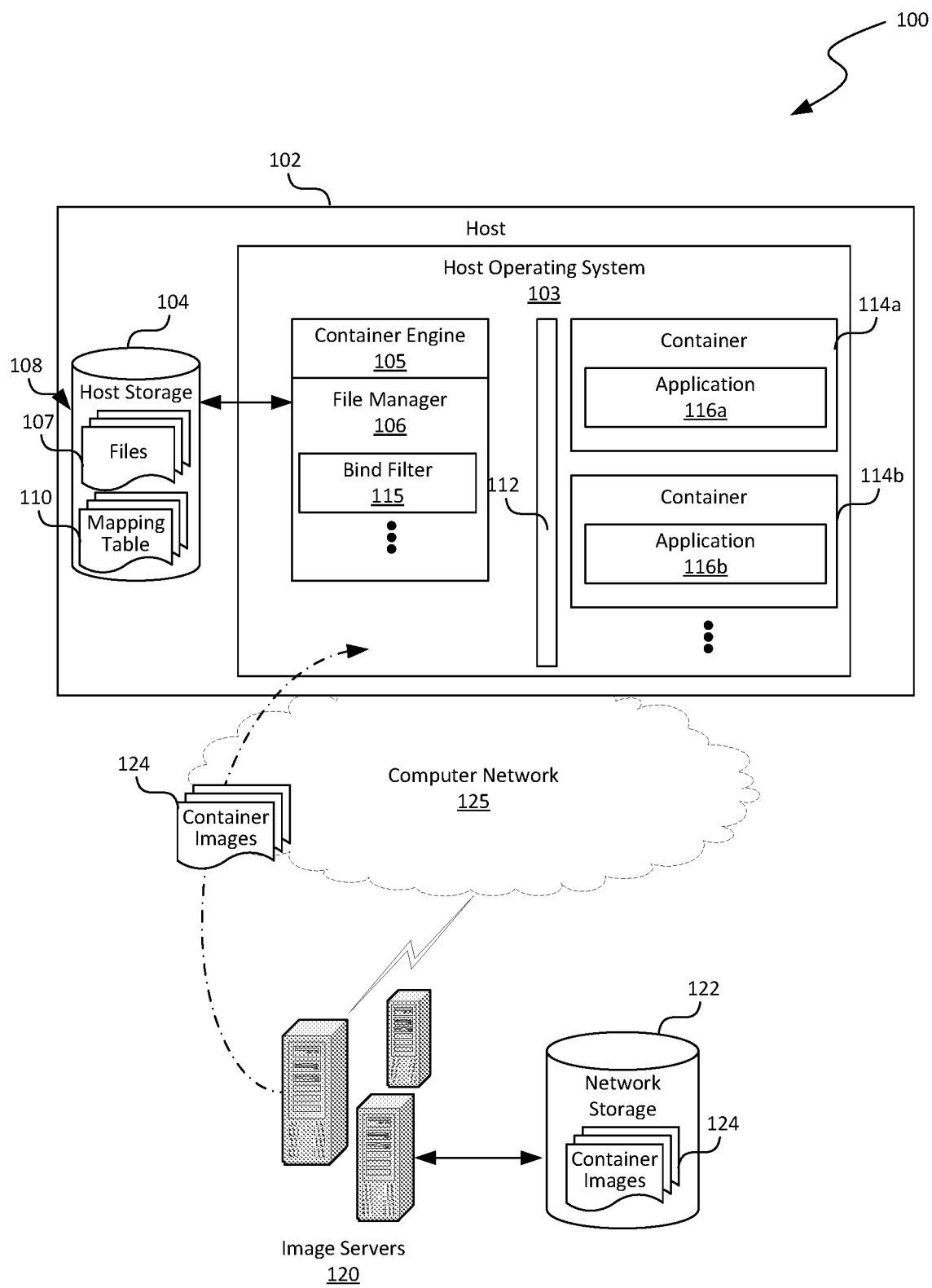
FIG. 1 is a schematic diagram of a computing system implementing dynamic image composition for deploying containers in accordance with embodiments of the disclosed technology.

Certain embodiments of systems, devices, components, modules, routines, data structures, and processes for dynamic image composition for container deployment on computing devices are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, a "host" or "host device" generally refers to a computing device that is configured to implement, for instance, one or more virtual machines, containers, or other suitable virtualized components. For example, a host can include a remote server having a hypervisor configured to support one or more virtual machines, containers, or other suitable types of virtual components. In another example, a host can also include a desktop computer, a laptop computer, a smartphone, a web-enabled appliance (e.g., a camera), or other suitable computing devices configured to implement one or more containers or other suitable types of virtual components.

Also used herein, the term "container" generally refers to a software package that contains a piece of software (e.g., an application) in a complete filesystem having computer codes (e.g., executable instructions), a runtime environment, system tools, system libraries, device drivers, or other suitable components sufficient to execute the piece of software. Containers running on a single host or virtual machine can all share the same operating system kernel and can make use of system memory or virtual memory. Containers can have similar resource isolation and allocation benefits as virtual machines. However, a different architectural approach allows containers to be much more portable and efficient than virtual machines. For example, a virtual machine typically includes one or more applications, necessary binaries and libraries of the applications, and an entire operating system. In contrast, a container can include an application and all of its dependencies but shares an operating system kernel with other containers on the same host. As such, containers can be more resource efficient and flexible than virtual machines. One example container is a Windows Server container by Microsoft Corporation of Redmond, Washington Another example container is a Linux container or LXC. Docker is a popular mechanism to package and deliver containers, provided by Docker, Inc. of San Francisco, California.

Also used herein, a "container image" generally refers to a software package of a container deployable on a host device. A container image can include digital data representing a complete filesystem (e.g., organized as a file folder with subordinate file folders) that contains operating system kernels, device drivers, event logs, temporary files/directories, applications, and/or other suitable components or references thereof. In accordance with embodiments of the disclosed technology, container images can include digital data representing files unique to a container. Examples of such unique files can include event log files, temporary files, application files, etc. that are not available from a host device. The container image can also include multiple symbolic links, soft links, reparse points, or other suitable reference placeholders to additional files available from the host device. Further used herein, a "container process" generally refers to an instance of a container image that is being executed by a processor of a host device. The instance of the container typically contains program codes and associated activities of the container.

Also used herein, a "filesystem" generally refers to a software component configured to control how data is stored and retrieved from a storage device on a host device.

Examples of the storage device can include hard disk drives, solid state devices, magnetic tapes, network drives, or other suitable persistent storage devices. Example filesystems can include file allocation table (FAT), New Technology File System (NTFS), Extents File System (XFS), etc. A user can access files in a filesystem via a "file manager" that is a computer program that provides a user interface to manage files and folders. File managers typically provide functionalities such as creating, opening (e.g. viewing, playing, editing, or printing), renaming, moving or copying, deleting, searching for files, as well as modifying file attributes, properties, and file permissions. One example file manager is Windows File Manager® provided by Microsoft Corporation of Redmond, Washington.

Further used herein, a "file path" or "path" generally refers to data that specifies a unique location of a corresponding file, directory, or drive in a filesystem. A path can include a drive, a directory, a file name, or other suitable components separated by delimiting characters, such as a slash ("/"), a backslash ("\"), or a colon (":"). An "absolute" or "full path" points to a location in a file system regardless of a current working directory. An example of a full path is "c:\windows\system32\ntdll.dll." In contrast, a "relative path" starts from a given working directory (e.g., "c:\windows\"), avoiding the need to provide a full path. An example of a relative path is "\system32\ntdll.dll," which can be concatenated to obtain a full path of "c:\windows\system32\ntdll.dll" if the working directory is "c:\windows\".

Also used herein, a "bind filter" generally refers to a software filter that is configured to bind a file system namespace to a different location external to the file system according to a mapping table. In certain implementation, such binding can be transparent from users. As such, a bound file and a local file can be indistinguishable to users. The term "mapping table" generally refers to a table or other suitable data structures containing entries individually identifying a file path or location to a reparse point. The individual entries can include data identifying a virtual root, a target root, an exception root, and other relevant options. In certain implementations, the mapping table can be arranged in a tree data structure. For example, every node of the tree can correspond to a component of a virtual root and contains a pointer to a corresponding target root. In other implementations, the mapping table can be arranged as a table, an array, or other suitable data structures.

Further used herein, a "package" or "file package" generally refers to a logical grouping of one or more files that correspond with a functionality. The files may be stored near one other in a file system, or may be stored in different locations (e.g., local versus remote locations). In addition to files, a package can also include a mapping file that contains entries that each map to a location of each of the files in the package. The mapping file can be present on disk for a bind filter to consume to build a mapping table. As such, the mapping file can serve as mapping configuration for the bind filter. A storage model for the mapping files can be divided into a local binding store (per container) and a global binding store (for multiple containers). A local binding store includes mapping configurations data for bindings that are local to the container. For example, a debug package can be stored in a local binding store because only one container is debugged at one time. A global binding store includes mapping configurations that apply to multiple containers. Example mapping configurations can include packages such as .NET provided by Microsoft Corporation of Redmond, Washington.

Even though container images are much smaller than virtual machine images, deploying container images in low resource computing systems may still be a challenge. One technique to further reduce data sizes of container images includes dynamically generating a container image during deployment time based on a recipe file included in the container images in addition to files unique to a container. The recipe file can also include reparse points stored in a VHD. The reparse points can identify software components, such as, kernel modules, device drivers, applications, etc. that are available from a host operating system at the host device. During deployment, a container manager on the host device can dynamically generate a full container image according to the reparse points by copying the identified components from the host operating system or creating hard links to the identified components of the host operating system. As such, the sizes of the container images transmitted for deployment can be further reduced, for example, from a few gigabytes to a few hundred megabytes.

The foregoing dynamical generation technique, however, may cause other operational issues under certain circumstances. For example, during deployment, the components identified in the recipe file are typically pre-defined. As such, additional components (e.g., additional files or reparse points) to the initially deployed container image may not be added after the container starts running. In addition, using VHDs to store the reparse points can still occupy a significant amount of storage space. Moreover, a predefined VHD stack can become unreliable as third-party drivers of storage devices sometimes disrupt the predefined VHD stack to result in unsupported errors. Further, producing a container image for deployment may require significant amount of build time and resulting in high production costs. For instance, to build a container image, a first virtual machine is initiated to run setup on a VHD according to a recipe file. A second virtual machine can then be created to provide the container image captured in the VHD for deployment. As such, by using two virtual machines to generate and provide for deployment the container image, the deployment process can incur significant amount of build time and thus resulting in high production costs.

Several embodiments of the disclosed technology can address certain aspects of the foregoing drawback by implementing a bind filter to dynamically identify and facilitate access to additional and/or different files and components of a container image based on a mapping table. In certain embodiments, a container image can include a recipe file having identification of multiple files and mapping configuration data with entries individually identifying a location of each of the multiple files identified in the container image. Upon receiving the recipe file, a container manager on a host device can initiate a bind filter and construct a mapping table for the bind filter based on the mapping configuration data. The constructed mapping table can include entries each identifying a location of each of the multiple files identified in the container image. During operation, when a file in the container image is requested, for instance, by an executed application, a corresponding IO request is redirected by the container manager (or other suitable components) to the bind filter. In turn, the bind filter can look up, from the mapping table, a location of the requested file and redirect the IO request to the identified location. As such, several embodiments of the disclosed technology can thus further reduce data sizes of container images from a few hundred megabytes to less than one hundred megabytes and allow flexible deployment and update of container images on the host device, as described in more detail below with reference to FIGS. 1-6.

FIG. 1 is a schematic diagram illustrating a computing system 100 implementing dynamic image composition during container deployment in accordance with embodiments of the disclosed technology. In FIG. 1 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1, the computing system 100 can include a host 102 interconnected, via a computer network 125, to one or more image servers 120 interconnected with a network storage 122 containing copies of container images 124. The computer network 125 can include an intranet, a wide area network, an internet (e.g., the Internet), or other suitable types of network. Even though particular components of the computing system 100 are shown in FIG. 1, in other embodiments, the computing system 100 can also include additional and/or different components or arrangements. For example, in certain embodiments, the computing system 100 can also include additional hosts, servers, and/or other suitable components (not shown). In other embodiments, the image servers 120 may be omitted. Instead, container images 124 may be provided to the host 102 via removable storage devices (e.g., flash drives), or in other suitable manners.

The image servers 120 can include one or more remote servers or other suitable types of computing devices that are configured to generate, organize, and provide copies of the container images 124 from the network storage 122 to the host 102 or to other suitable host devices (not shown). In certain embodiments, the image servers 120 can be configured to generate the container images 124 that include files unique to a container 114 or identifications to files 107 already present on the host 102. In other embodiments, the image servers 120 can be configured to generate the container images 124 as a file folder, a directory, a compressed file, and/or other suitable types of software packages. As shown in FIG. 1, upon receiving a request from the host 102, the image servers 120 can be configured to provide a copy of a requested container image 124 to the host 102 via the computer network 125. As described in more detail below, the provided container image 124 can include mapping configuration data corresponding to the multiple files identified in the container image 124 and can be used to redirect requests to certain files 107 in a host storage 104 on the host 102.

The host 100 can be a server, a desktop or laptop computer, a smart phone, or other suitable types of computing device. As shown in FIG. 1, the host 102 can include a host operating system 103 having a container engine 105 and a file manager 106 interconnected to a host storage 104 containing files 107 and a mapping table 110. A host filesystem 108 can be configured to organize the files 107. The mapping table 110 can include entries each containing a reference placeholder (e.g., a reparse point) and a corresponding file 107 in the host filesystem 108 on the host 102 or other suitable locations. Though particular components of the host operating system 103 are shown in FIG. 1, in other embodiments, the host operating system 103 can also include device drivers, event logs, temporary files, utility applications, and/or other suitable software components.

The host storage 104 can include any suitable computer readable storage device configured to contain digital data. Example host storage 104 can include hardware/software components such as hard disk drives, solid state drives, and associated file systems. In the illustrated embodiment, the mapping table 110 is shown as being stored in the host storage 104. In other embodiments, the mapping table 110 can also be stored on a removable storage device (e.g., a flash drive), a remote server (not shown), or other suitable locations accessible by the file manager 106 via the computer network 125. Though only one mapping table 110 is shown in FIG. 1, in other embodiments, multiple mapping tables 110 corresponding to multiple containers 114 can be stored in corresponding local storage, a local binding store (not shown) while other mapping tables 110 applicable to multiple containers 114 can be stored in a global binding store (not shown).

Also shown in FIG. 1, the host operating system 103 can be configured to support one or more guest operating systems such as containers 114 (shown as first and second containers 114a and 114b, respectively) individually executing one or more applications 116 (shown as first and second application 116a and 116b, respectively). In other embodiments, the host operating system 103 can also include virtual switches (not shown), virtual routers (not shown), or other suitable virtual components configured to facilitate operations of the containers 114 and/or the applications 116. The first and second containers 114a and 114b each executing one application 116a and 116b are shown in FIG. 1 for illustration purposes. In other embodiments, the host operating system 103 can support three, four, or any other suitable numbers of containers 114 each executing any suitable numbers of applications 116.

As shown in FIG. 1, a security boundary 112 isolates the containers 114 from the host operating system 103. The security boundary 112 can be implemented as a set of rules (not shown) in the host operating system 103 to limit or prevent the containers 114 and/or the applications 116 from accessing certain hardware/software resources in the host operating system 103. For example, the security boundary 112 can limit or prevent the containers 114 from accessing compute, storage, network, or other suitable types of resources available to the host operating system 103.

The container engine 105 can be configured to manage deployment and execution of the containers 114 and applications 116. For example, the container engine 105 can be configured to collect container metrics, instantiating, starting, suspending, stopping one or more the containers 114, managing resources available to the containers 114, facilitating execution of container commands, and other suitable operations. In accordance with embodiments of the disclosed technology, the container engine 105 can also be configured to deploy the containers 114 based on the container images 124 received from, for instance, the image servers 120. The container images 124 can include files, identification of files, and mapping configuration data corresponding to each of the files and the identification of files. Example operations of deploying a container 114 in accordance with embodiments of the disclosed technology are described below with reference to FIGS. 2A and 2B while operations of the container 114 are described below with reference to FIGS. 3A-3C.

The file manager 106 can be configured to provide a user interface to manage files 107 and folders (not shown) stored at the host storage 104. In certain embodiments, the file manager 106 can include one or more filesystem filters individually configured to perform certain file system functions in order to accommodate data storage in the host storage 104. Example functionalities can include creating time stamps, creating last change time stamps, etc. In accordance with embodiments of the disclosed technology, a bind filter 115 can be configured to resolve reparse points included in the container images 124 during runtime. As such, the file manager 106 can be configured to locate and serve requested files 107 for the containers 114, as described in more detail below with reference to FIGS. 3A-3C. In some embodiments, the container images 124 can be updated atomically. In other embodiments, the image servers 120 may also serve a differentiated (or "diff") image to a "baseline" container image, in which patched and/or updated files are present to provide an efficient update mechanism.

Figure 2A:
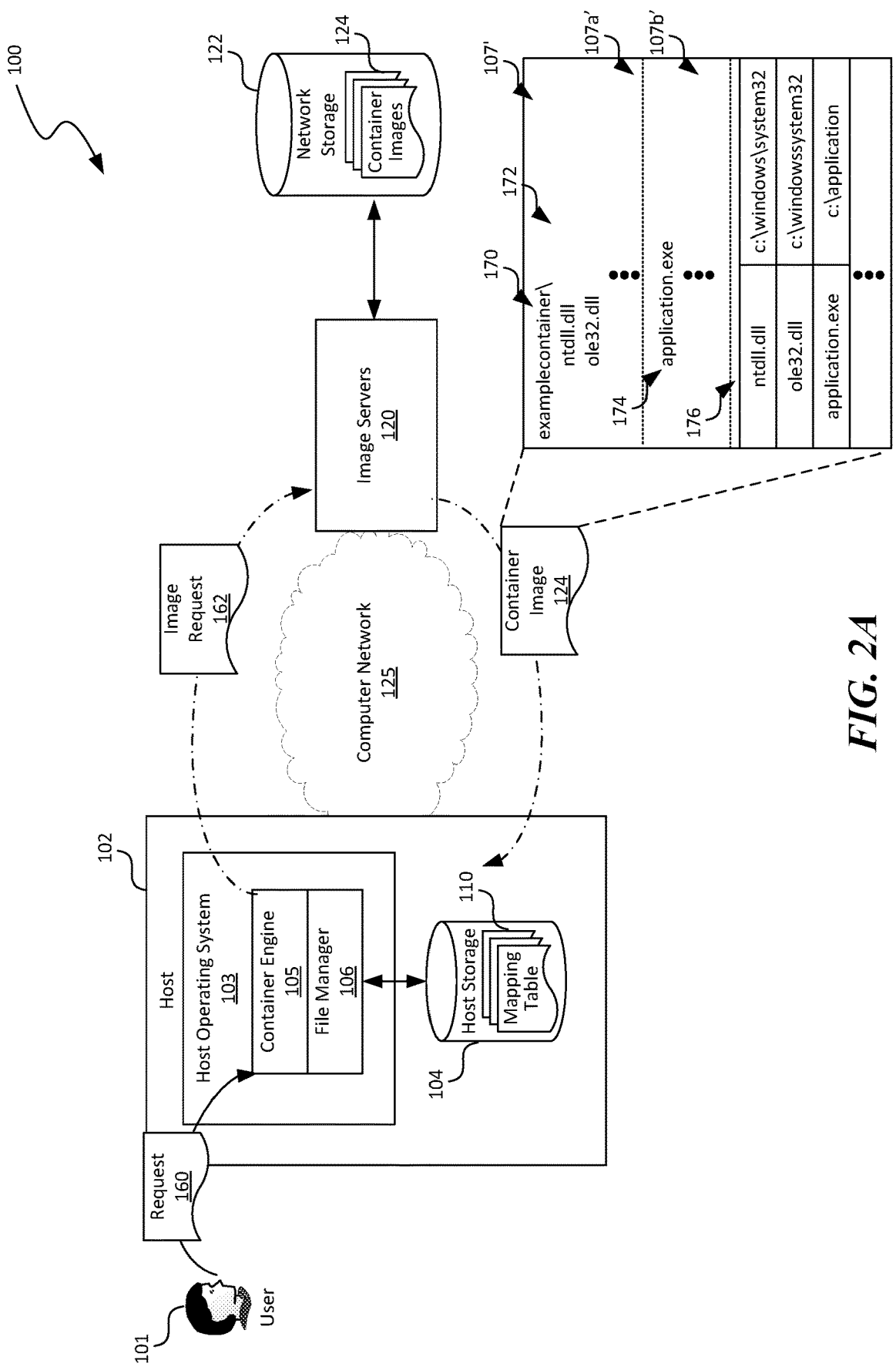
FIGS. 2A and 2B are schematic diagrams illustrating certain hardware/software components of a host in the computing system of FIG. 1 during certain stages of deploying a container image in accordance with embodiments of the disclosed technology.
Figure 2B:
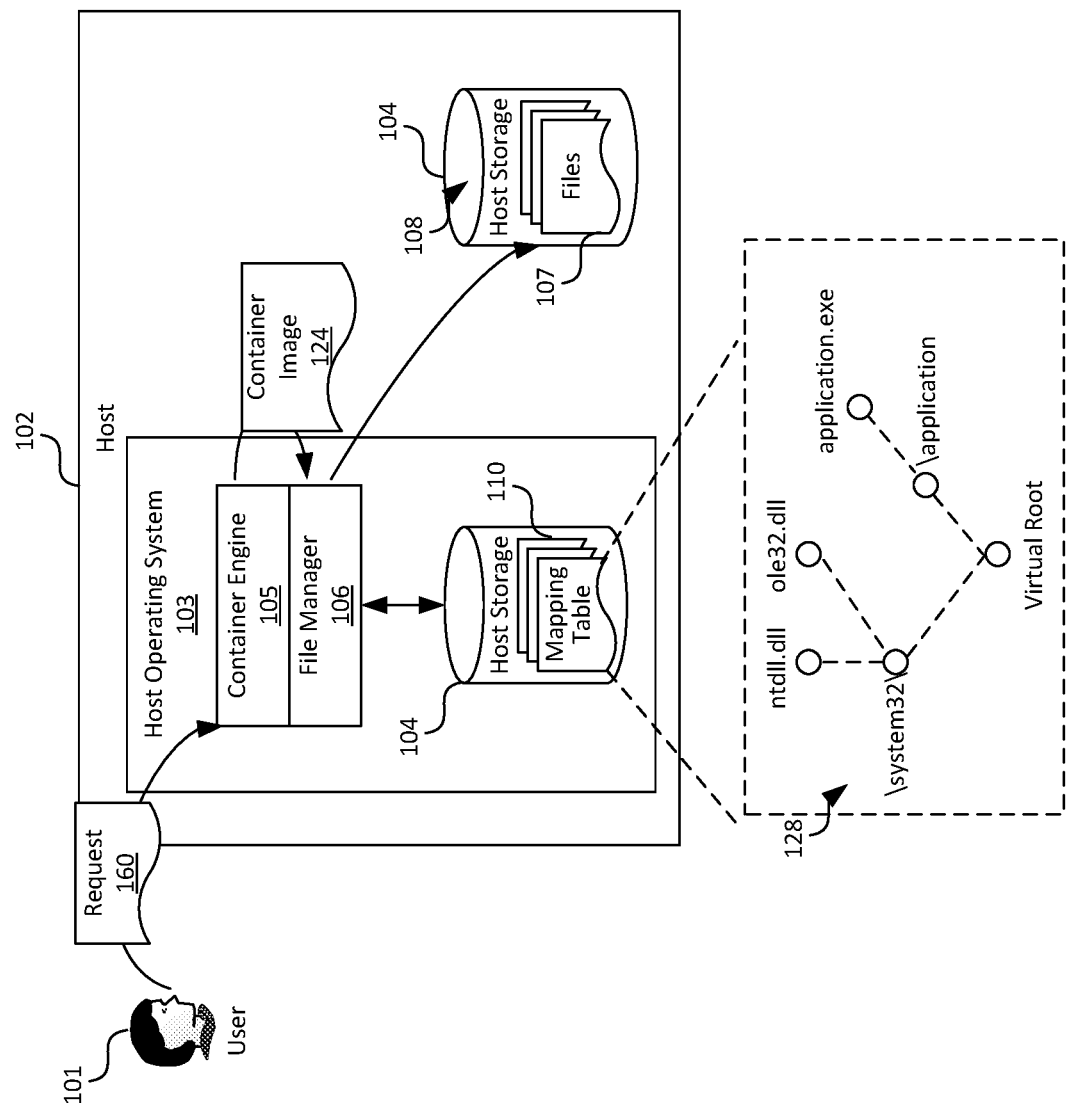

FIGS. 2A and 2B are schematic diagrams illustrating certain hardware/software components of the host 102 of FIG. 1 during certain stages of deploying a container 114 in accordance with embodiments of the disclosed technology. In FIGS. 2A and 2B and in other figures herein, certain components of the computing system 100 are omitted for brevity. As shown in FIG. 2A, a user 101 can submit a request 160 to the container engine 105 for deploying a container 114 (FIG. 1) on the host 102. In response to receiving the request 160 from the user 101, the container engine 105 can transmit an image request 162 to the image servers 120 via the computer network 125. In response, the image servers 120 can retrieve a suitable container image 124 and transmit the located container image 124 to the host 102. In other embodiments, the container engine 105 may retrieve a copy of the container image 162 from the host storage 110 or other suitable locations.

The container image 124 can be organized in many suitable ways. For example, as shown in FIG. 2A, the container image 124 can be configured as a file folder 170 (i.e., "examplecontainer\") with multiple files 107' in the file folder 170. The files 107' can include a first subset of files 107a' identified individually by a file identifier 172. In the illustrated embodiment, the file identifiers 172 each include identification of various files 107, for instance, "ntdll.dll" and "ole32.dll." In the example shown in FIG. 2A, the file identifiers 172 are each identified by a corresponding file name. In other examples, the file identifiers 172 can be identified by a unique file identifier, an alphanumerical string, or other suitable identifiers. The container image 124 can also include a second subset of files 107b' identified individually by a hard link 174. The hard links 174 can identify files 107b' that are unique to the container 114. In the illustrated example, the hard link 174 identifies an executable file of an application named "application.exe." In other embodiments, the hard links 174 can also identify event logs, temporary files, or other suitable files 107' of the container 114.

As shown in FIG. 2A, the container image 124 can also include mapping configuration data 176 that have entries individually identifying one of the files 107' in the container image 124 and a corresponding location at which the files 107' are to be accessed. For instance, the "ntdll.dll" and "ole32.dll" are to be accessed from "c:\windows\system32" while "application.exe" is to be accessed via "c:\application." Though the mapping configuration data 176 are shown in FIG. 2A as a table, in other implementations, the mapping configuration data 176 can be stored as metadata to the identification of files or in other suitable manners.

Upon receiving the container image 124, the container engine 105 can be configured to deploy the container 114 facilitated by the file manager 106. For example, in one embodiment, the container engine 105 can be configured to generate a mapping table 110 for the instantiated container 114 using the mapping configuration data 172. As shown in FIG. 2B, various components of the container image 124 can be organized as a tree 128 having a virtual root and various branches corresponding to a directory and/or file 107'. Each of the nodes in the tree 128 can correspond to a location identified by the mapping configuration data 176. For example, a node representing the virtual root can correspond to "c:\" on the host 102 while "/system/32" corresponds to the same directory on "c:\" of the host 102. As described in more detail below with reference to FIGS. 3A and 3B, the file identifiers 172 can be resolved by the file manager 106 during runtime, and thus redirect file request and retrieval during runtime.

Several embodiments of the disclosed technology can further reduce data size of the container image 124 by excluding reparse points for various files 107 copies of which are to be obtained from the host storage 104. As discussed above, reparse points for the various files 107 can occupy significant storage space. By eliminating the reparse points and instead including only a file identifier 172 and a corresponding location, the container image 124 can be significantly reduced.

Figure 3A:
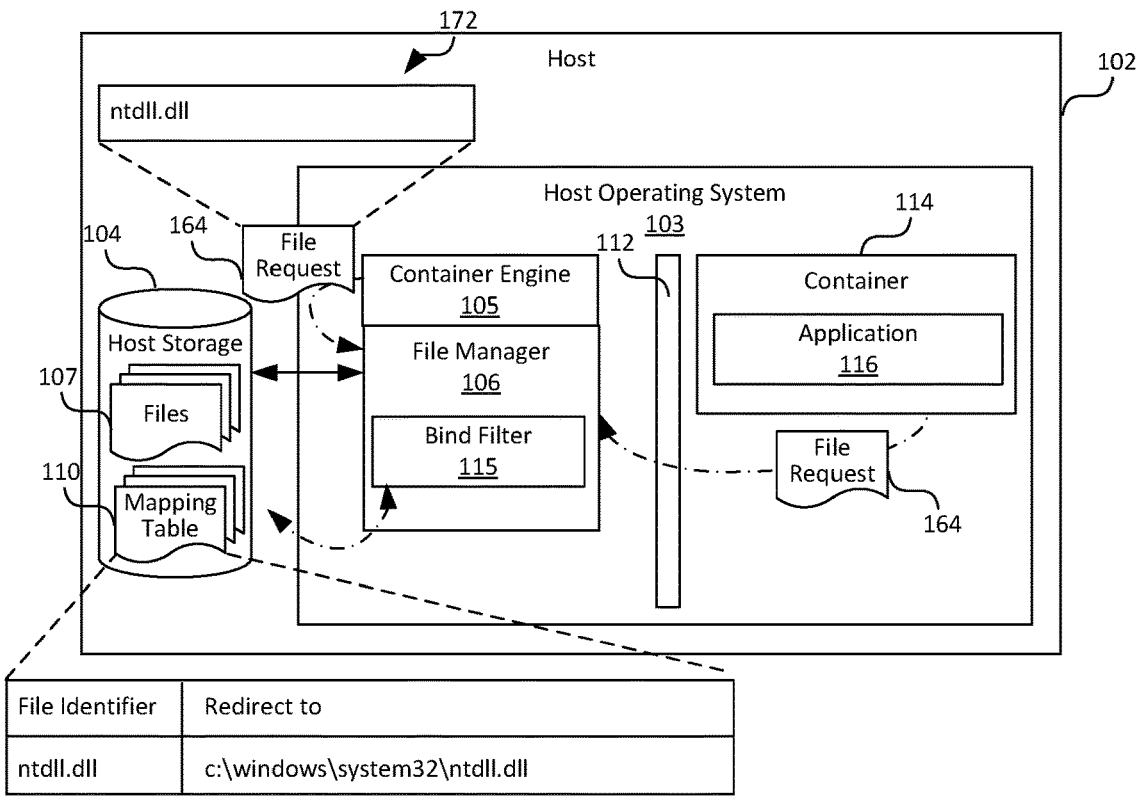
FIGS. 3A and 3B are schematic diagrams illustrating certain hardware/software components of a host in the computing system of FIG. 1 during certain stages of executing applications in accordance with embodiments of the disclosed technology.
Figure 3B:
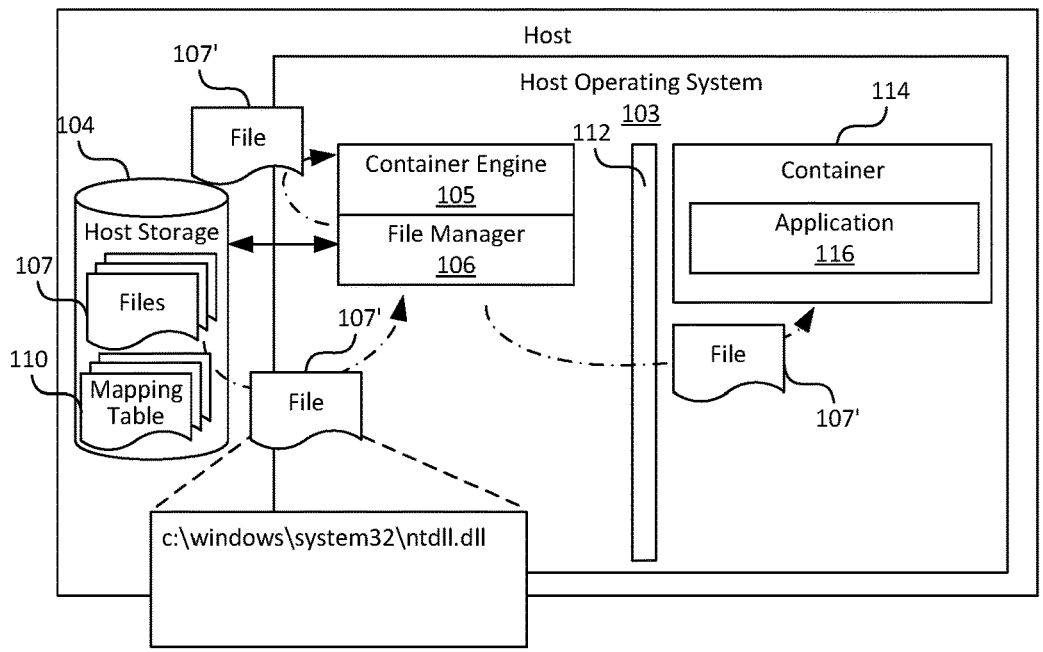

FIGS. 3A and 3B are schematic diagrams illustrating certain hardware/software components of the host 102 in the computing system 100 of FIG. 1 during certain stages of performing file location redirection during runtime in accordance with embodiments of the disclosed technology. As shown in FIG. 3A, during runtime, the container engine 105 can initiate a container process for executing the application 116 in the container 114. During execution, the container process can transmit, via the container engine 105, a file request 164 for a file 107 in the container image 124 (FIG. 2B). In the illustrated example, the requested file 107 is identified by a file identifier 172 "ntdll.dll."

Upon receiving the file request 164, the bind filter 115 of the file manager 106 can be configured to bind the file identifier 172 to a corresponding file 107 by looking up the mapping table 110 to obtain a redirected location for the requested file 107, for example, "c:\windows\system32\ntdll.dll." The bind filter 115 (or other suitable components of the file manager 106) can then retrieve, from the storage device 104, a copy or a pointer of the file 107 according to the obtained redirected location for the requested file 107 (e.g., via full path of the file 107) and serv the retrieved copy or pointer of the file 107' to the container process, as shown in FIG. 3B.

In some embodiments, a backup and/or caching system (not shown) may be implemented in the mapping table 110 and/or components supporting the mapping table 110. In one example, for a target file 107, the mapping table 110 may have both a primary location and a backup location for the same target file 107. In another example, for a target file 107, the mapping table 110 may have two instances of the same file 107 that have different security profiles (e.g. hosting locations, container locations, digital signatures, etc.). During operation, the mapping table 110 and/or the bind filter 115 can be configured to select one of the instances of the file 107 or from one of the file locations based on security, availability, or some other parameters. For instance, if a requesting container 114 is outside of a secure network, the mapping table 110 and/or the bind filter 115 may prefer an instance of the file 107 from a secure location. However, if the requesting container 114 is in a secure network, and a local file source is available, the mapping table 110 and/or the bind filter 115 may select an instance of the file 107 from that local network. In yet another example, a caching system (not shown) may be implemented, for example, on the host storage 104, to ensure that the mapping table 110 has the most up-to-date version of a file 107. The mapping table 110 can be configured to provide a particular version (e.g., the most recent version, last version, etc.) of the file 107 based on a file version number, publication date, or other suitable metadata.

In other implementations, the file manager 106 (or other suitable components of the host 102) can also be configured to examine the file request 164 for a file 107 from the container 114 and serve the requested file 107 based on profile of the container 114. In some embodiments, the file manager 106 can examine the container 114 that is requesting the file 107, analyze a profile of the container 114 (e.g. hardware/software configuration, location, or other metadata) and determine which file 107 to serve. In one example, the container 114 may have certain hardware requirements, and the file manager 106 can be configured to provide the appropriate file 107 or a version of the file 107 (e.g., a software driver) to the container 114. In another example, the container 114 may be in an insecure location and the file manager 106 can only serve files 107 that are publicly known, and not provide access to files that implement proprietary functionality or trade secrets.

Figure 4A:
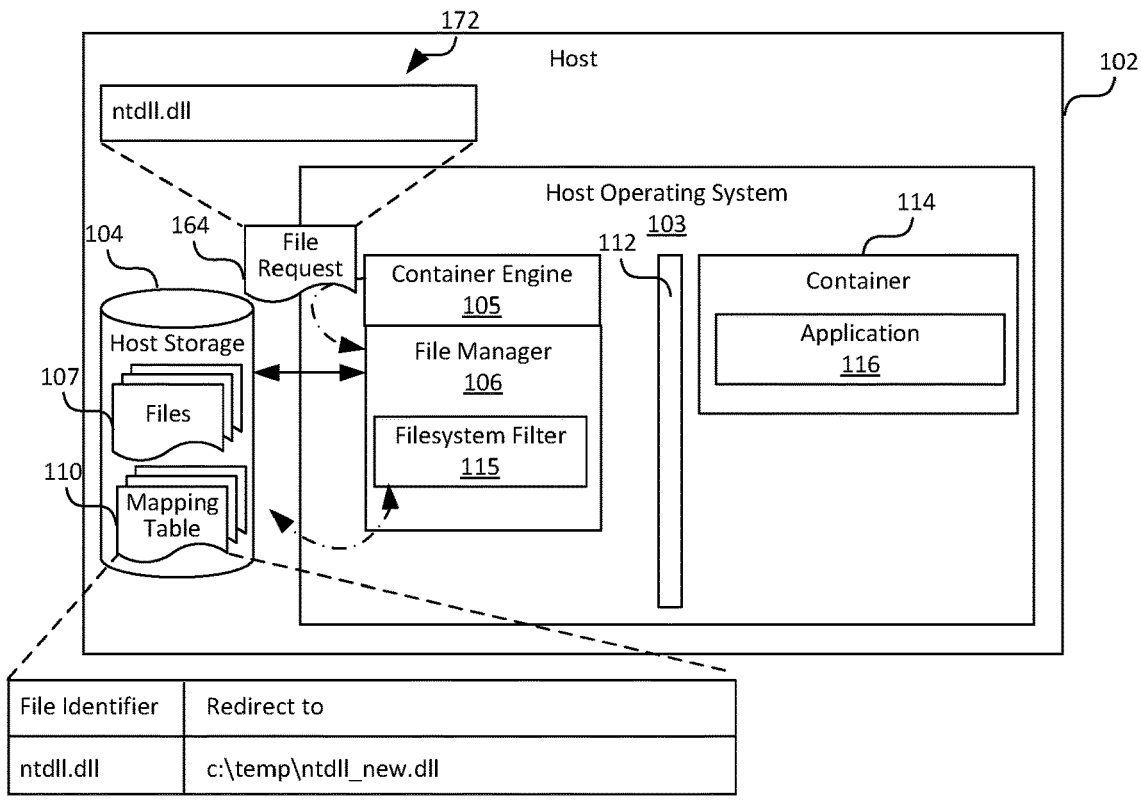
FIGS. 4A and 4B are schematic diagrams illustrating certain hardware/software components of a host in the computing system of FIG. 1 during certain stages of updating a container image in accordance with embodiments of the disclosed technology.
Figure 4B:
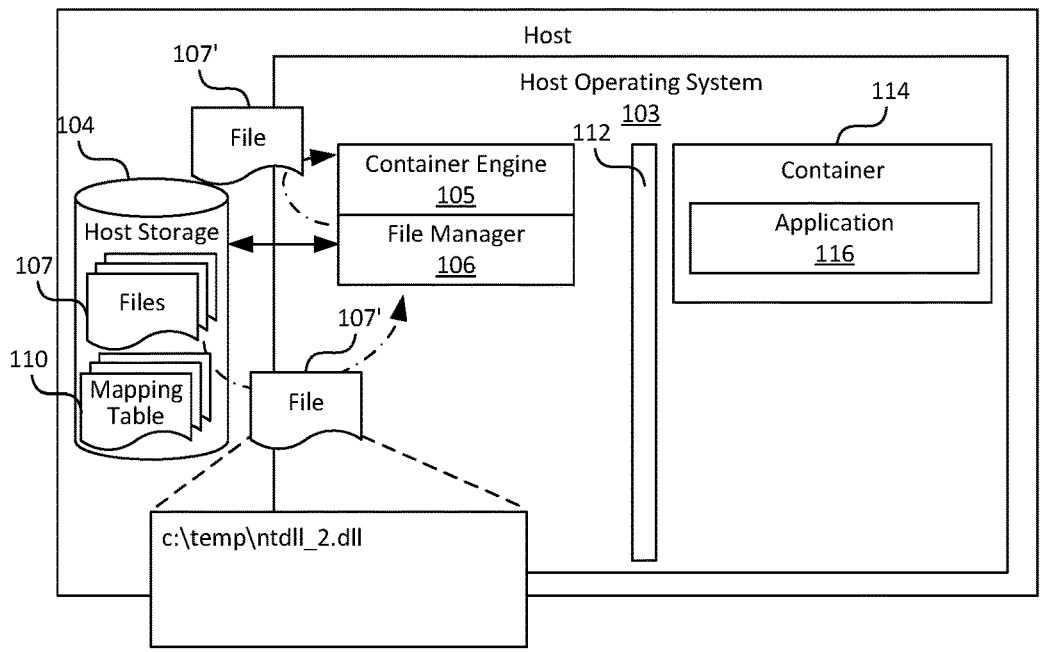

FIGS. 4A and 4B are schematic diagrams illustrating certain hardware/software components of a host 102 in the computing system 100 of FIG. 1 during certain stages of updating a container image 124 in accordance with embodiments of the disclosed technology. As shown in FIG. 4A, in the illustrated example, a new file "ntdll_new.dll" is to be used instead of the original "c:\windows\system32\ntdll.dll." Such an update can be performed by updating the mapping table 110 with a new entry corresponding to the file 107. As such, the file identified by the file identifier 172 "ntdll.dll" can be corresponded to a new file located at "c:\temp\ntdll_new.dll." During runtime, upon receiving another file request for "ntdll.dll," the bind filter 115 of file manager 106 can be configured to bind the file identifier 172 to the file 107 by looking up the mapping table 110 to obtain a new redirected location for the requested file according to the updated entry, for example, "c:\temp\ntdll_new.dll." The bind filter 115 (or other suitable components of the file manager 106) can then retrieve, from the storage device 104, a copy of the file 107' according to the obtained new redirected location of the file 107' and serving the retrieved copy of the file 107' to the container process, as shown in FIG. 4B. As such, components of the container image 124 (FIG. 1) can be updated on the flight without shutting down the container 114.

The above update operations can be applied to both host system updates (e.g., updates to the host operating system 103) periodically as well as independent feature updates that occur at irregular cadences. The independent feature changes are especially well-addressed by the above as currently it is hard to deterministically know what version of the feature is on the host 102. The disclosed technology enables files or packages of files to be added to a "baseline" version of the container 114 even when the container 114 is running, and thus enabling dynamic addition of files or packages. The implementation of the bind filter 115 can also speed up debugging of the container 114. Currently, to debug a container 114, a debug layer is created by assigning a reparse point for every single file in the container 114. Such a process takes significant time (e.g., 20 to 30 seconds) and I/O to setup. Several embodiments of the disclosed technology can enable selective debugging as only mappings to files 107 being tested may be mapped in a filter to be accessible to a debugger.

Though the particular aspects of the disclosed technology are described above in the context of deploying containers 114, embodiments of the disclosed technology can also be applied to updating operation system on, for example, a virtual machine (not shown) or the host operating system 103 (FIG. 1). Current operating system update pipelines have a variety of security risks and attack vectors. Malware and other malicious software can disable operating system updates on the host 102.

Several embodiments of the disclosed technology can allow efficient and secure update to host operating systems. In one implementation, an update cloud store notifies a target host 102. This notification includes a lightweight package with mapping configuration data 176 that contains mappings to the cloud-hosted file location. For each new file request for a file 107, the bind filter 115 checks whether the file location is local or in the cloud. If the location is in the cloud, the bind filter 115 can determine that the current operation is a first time the host 102 has tried to use the updated file 107. The bind filter 115 can then direct the request to the cloud-hosted location and copy the file locally from the cloud. After copying the updated file 107, the bind filter 115 may store the copy in a temporary location if there is an active handle on an old version of the file 107 indicating that a copy of the old version is currently in use, or immediately overwrite the existing local copy of the file 107 if there is no active handle on the old version. The bind filter 115 can then proceed to update the mapping table 110 according to the new location of the updated file, until eventually the updated file is present in the intended local location. The foregoing update pipeline can be further secured through applications of file encryption in the cloud/over the network, or via technologies such as enclaves.

Figure 5A:
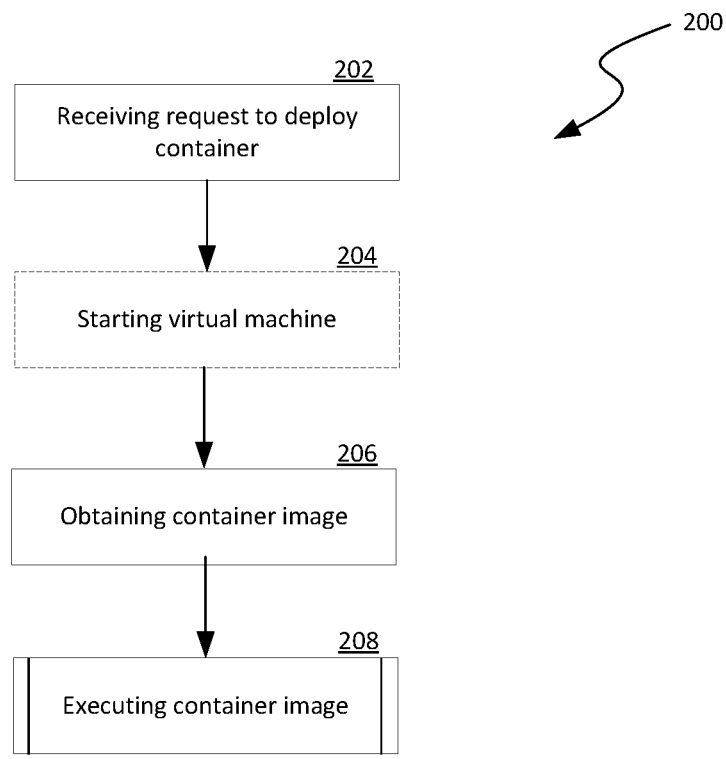
FIGS. 5A and 5B are flowcharts illustrating various processes of deferred path resolution for deploying containers in accordance with embodiments of the disclosed technology.
Figure 5B:
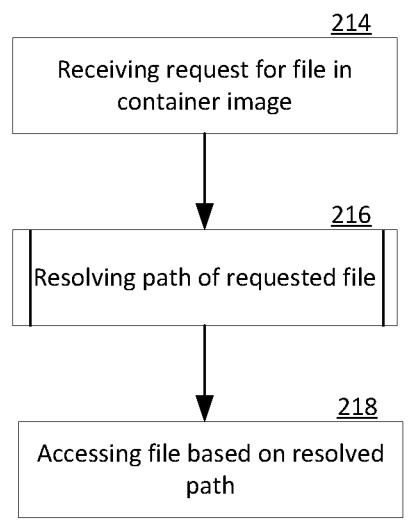

FIGS. 5A-5C are flowcharts illustrating various processes of deferred path resolution for deploying containers in accordance with embodiments of the disclosed technology. Even though the processes are described below with reference to the computing system 100 of FIG. 1, in other embodiments, the processes can be implemented in computing systems with additional and/or different components.

As shown in FIG. 5A, a process 200 can include receiving a request to deploy a container at stage 202. In response to receiving the request, in certain embodiments, the process 200 can include optionally starting a virtual machine on a host 102 (FIG. 1) for hosting the container at stage 204. In other embodiments, the operation at stage 204 can be omitted. The process 200 can then include obtaining a container image at stage 212. In one example, the container image can be obtained from an image server 120 (FIG. 1). In other examples, the container image can be obtained via removable storage devices or other suitable sources. As described above with reference to FIGS. 2A and 2B, the obtained container image can include one or more mapping configuration data used for redirecting file access during runtime. The process 200 can further include executing the container image during runtime at stage 208. Example operations of executing the container image are described in more detail below with reference to FIG. 5B.

As shown in FIG. 5B, example operations of executing the container image can include receiving a request for a file in the container image at stage 214. In response to receiving the request, the operations include redirecting access of the requested file to a location identified by a mapping table at stage 216. The operations can then include accessing the file from the host 102 (FIG. 1) according to the location at stage 218.

Figure 6:
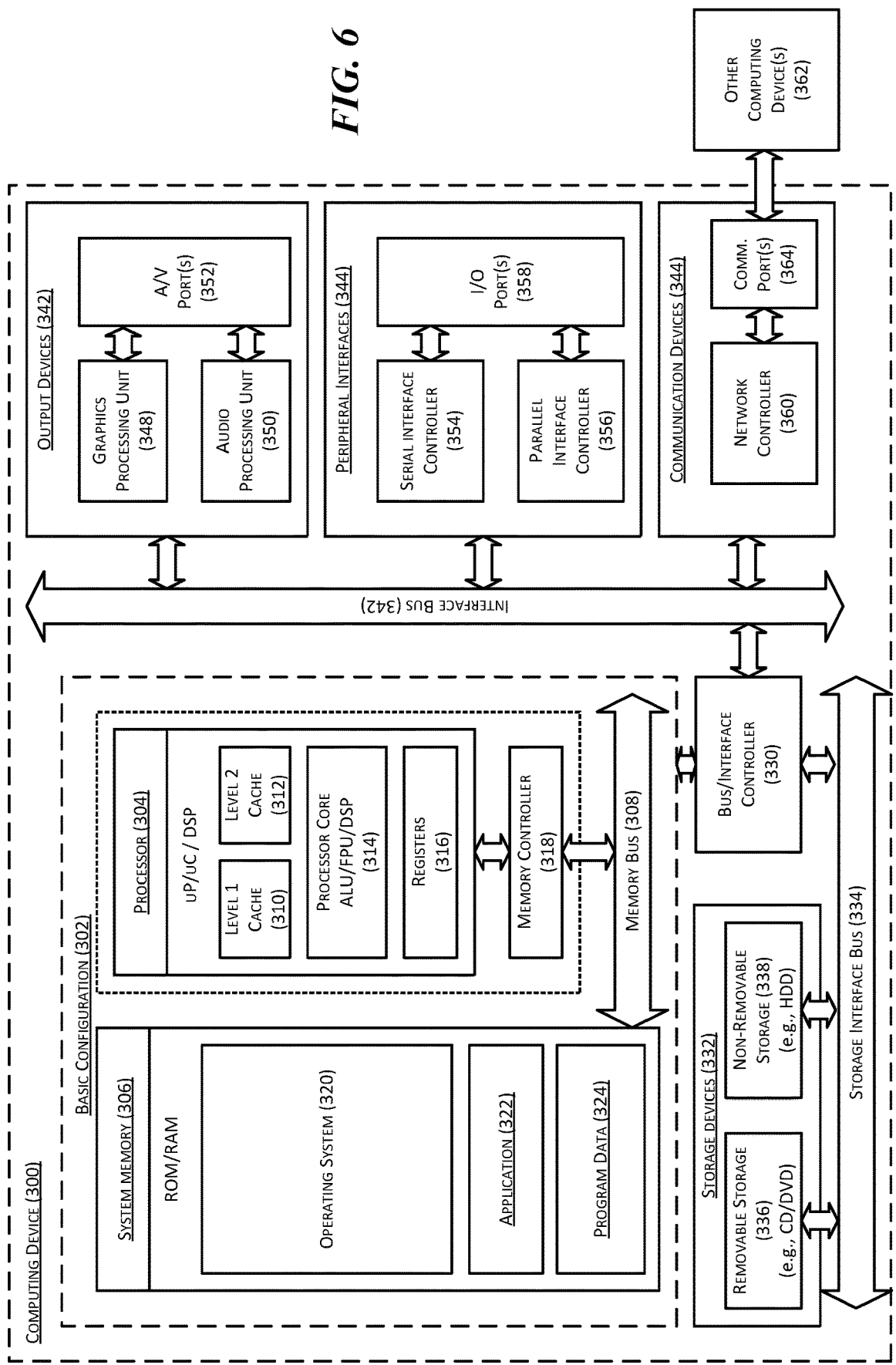
FIG. 6 is a computing device suitable for certain components of the computing system in FIG. 1.

FIG. 6 is a computing device 300 suitable for certain components of the computing system 100 in FIG. 1. For example, the computing device 300 can be suitable for the host 102 or the image servers 120 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, NVRAM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other local devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A system comprising:
a processor; and
a memory coupled to the processor, the memory comprising computer executable instructions that, when executed by the processor, perform operations comprising:
receiving, at a computing device, an indication that an updated version of a file is available, the file being stored in a container image that is associated with a container process of the computing device;
in response to determining the updated version is not currently available at the computing device, downloading to the computing device the updated version from a remote source;
accessing an entry in a mapping table corresponding to the container process, the entry comprising a file identifier for the file and identifying a current storage location of the file on the computing device;
updating the entry to indicate an updated storage location corresponding to the updated version; and
in response to receiving a request for the file, enabling the container process to access the updated version based on the entry comprising the updated storage location.

2. The system of claim 1, wherein:
the request for the file comprises the file identifier;
the file identifier in the request is matched to the file identifier in the mapping table to identify the entry; and
a pointer to the updated version is retrieved from the mapping table based on identifying the entry.

3. The system of claim 2, wherein:
the pointer is provided to the container process; and
the container process uses the pointer to access a file path to the updated version.

4. The system of claim 1, wherein the mapping table is a tree data structure such that each node of the tree data structure:
corresponds to a virtual root; and
includes a pointer to a corresponding target root.

5. The system of claim 1, wherein:
the computing device is a host device; and
the container image is software deployed on the host device, the container image comprising digital data representing a complete filesystem.

6. The system of claim 1, wherein the computing device comprises a software filter that binds a file system namespace to a location external to the computing device based on the mapping table.

7. The system of claim 6, wherein the software filter constructs the mapping table based on a recipe file included in the container image.

8. The system of claim 7, wherein the recipe file identifies software layers of the computing device, the software layers comprising at least one of:
a base layer for software components that are available from a host operating system of the computing device;
a modification layer for software components modified in the base layer; or
a scratch layer for capturing software component modifications that are unique to the container image.

9. The system of claim 6, wherein receiving the request for the file comprises:
redirecting the request for the file to the software filter;
looking up, by the software filter, the updated storage location; and
redirecting, by the software filter, the request for the file to the updated storage location.

10. The system of claim 1, wherein the indication that an updated version of the file is available is received from an update server located remotely from the computing device, the indication including updates to the mapping table.

11. The system of claim 1, wherein, after updating the entry to indicate the updated storage location, the mapping table comprises:
the current storage location for the file; and
the updated storage location for the updated version.

12. The system of claim 1, wherein enabling the container process to access the updated version comprises:
receiving, from the container process, the request for the file;
analyzing, by a file sharing server, a profile of a container associated with the container process; and
based on the analyzing, determining which version of the file to enable the container process to access.

13. A method comprising:
receiving, at a host device, an indication that an updated version of a file is available, the file being stored in a container image that is associated with a container process of the host device;
in response to determining the updated version is not currently available at the host device, retrieving a remote storage location for the updated version from a remote source;
accessing an entry in a mapping table corresponding to the container process, the entry comprising a file identifier for the file and identifying a local storage location of the file on the host device;
updating the entry to indicate the updated version and the remote storage location; and
in response to receiving a request for the file, enabling the container process to access at least one of the local storage location or the remote storage location based on a profile associated with the container image.

14. The method of claim 13, wherein:
retrieving the remote storage location comprises retrieving a pointer to the updated version on the remote source; and
updating the entry comprises storing the pointer in the entry.

15. The method of claim 13, wherein the file identifier comprises a file path and a file name of the file.

16. The method of claim 13, wherein the profile comprises at least one of:
- a hardware configuration for a container;
- software configuration for a container; or
- a geolocation of a container.

17. The method of claim 13, wherein enabling the container process to access the at least one of the local storage location or the remote storage location is further based on a security profile of the file.

18. The method of claim 17, wherein the security profile comprises at least one of:
- a geolocation of the host device;
- a security network used to by the container process; or
- a digital signature.

19. The method of claim 13, further comprising:
- further in response to determining the updated version is not currently available at the host device, downloading the updated version to the host device.

20. A device comprising:
- a processor; and
- a memory coupled to the processor, the memory comprising computer executable instructions that, when executed by the processor, perform operations comprising:
  - receiving an indication that an updated version of a file is available, the file being stored in a container image that is associated with a container process executing on the device;
  - in response to determining the updated version is not currently available at the device, retrieving the updated version or a remote storage location for the updated version from a remote source;
  - updating an entry in a mapping table corresponding to the container process by replacing a first local storage location of the file on the device with at least one of:
    - a second local storage location of the updated version on the device; or
    - the remote storage location; and
  - in response to receiving a request for the file, enabling the container process to access the updated version based on the entry.

\* \* \* \* \*